(12) United States Patent
D'Errico (10) Patent No.: US 6,216,202 B1
(45) Date of Patent: Apr. 10, 2001

(54) METHOD AND APPARATUS FOR MANAGING VIRTUAL STORAGE DEVICES IN A STORAGE SYSTEM

(75) Inventor: Matthew J. D'Errico, Southboro, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/107,617

(22) Filed: Jun. 30, 1998

(51) Int. Cl.[7] .............................. G06F 12/00; G06F 13/00
(52) U.S. Cl. ............................................ 711/112; 711/114
(58) Field of Search .................................... 711/112, 114, 711/170–173, 202, 203

(56) References Cited

U.S. PATENT DOCUMENTS

| | | | |
|---|---|---|---|
| 5,129,088 | * 7/1992 | Auslander et al. | 395/700 |
| 5,148,432 | * 9/1992 | Gordon et al. | 371/10.1 |
| 5,379,391 | * 1/1995 | Belsan et al. | 395/400 |
| 5,819,310 | * 10/1998 | Vishlitzky et al. | 711/114 |
| 5,897,661 | * 4/1999 | Gordon et al. | 371/10.1 |
| 5,905,995 | * 5/1999 | Tabuchi et al. | 711/114 |
| 5,973,690 | * 10/1999 | Ofer et al. | 345/340 |
| 5,983,316 | * 11/1999 | Norwood | 711/112 |

* cited by examiner

Primary Examiner—Matthew Kim
Assistant Examiner—Pierre M Vital
(74) Attorney, Agent, or Firm—Wolf, Greenfield & Sacks, P.C.

(57) ABSTRACT

A method and apparatus for managing a plurality of logical volumes in a computer system, the computer system including a processor and a storage system coupled to the processor, the storage system including at least one storage device, the storage system storing the plurality of logical volumes on the at least one storage device. At least two of the plurality of logical volumes are combined in the storage system into a virtual volume that is presented to the processor as a single logical volume. The storage system also presents the processor with information that enables the processor to deconstruct the virtual volume into the at least two of the plurality of logical volumes. Another aspect is directed to a multi-path computer system including a processor, a storage system including at least one storage device to store Y logical volumes, and X paths coupling the processor to the storage system. The processor is capable of accessing each of the Y logical volumes through each of the X paths, and includes Z unique target address identifiers identifying the Y logical volumes, wherein Z is less than X times Y.

53 Claims, 5 Drawing Sheets

Fig. 5

METHOD AND APPARATUS FOR MANAGING VIRTUAL STORAGE DEVICES IN A STORAGE SYSTEM

FIELD OF THE INVENTION

The present invention is directed to a method and apparatus for managing virtual storage devices in a storage system.

DESCRIPTION OF THE RELATED ART

Figure 1:
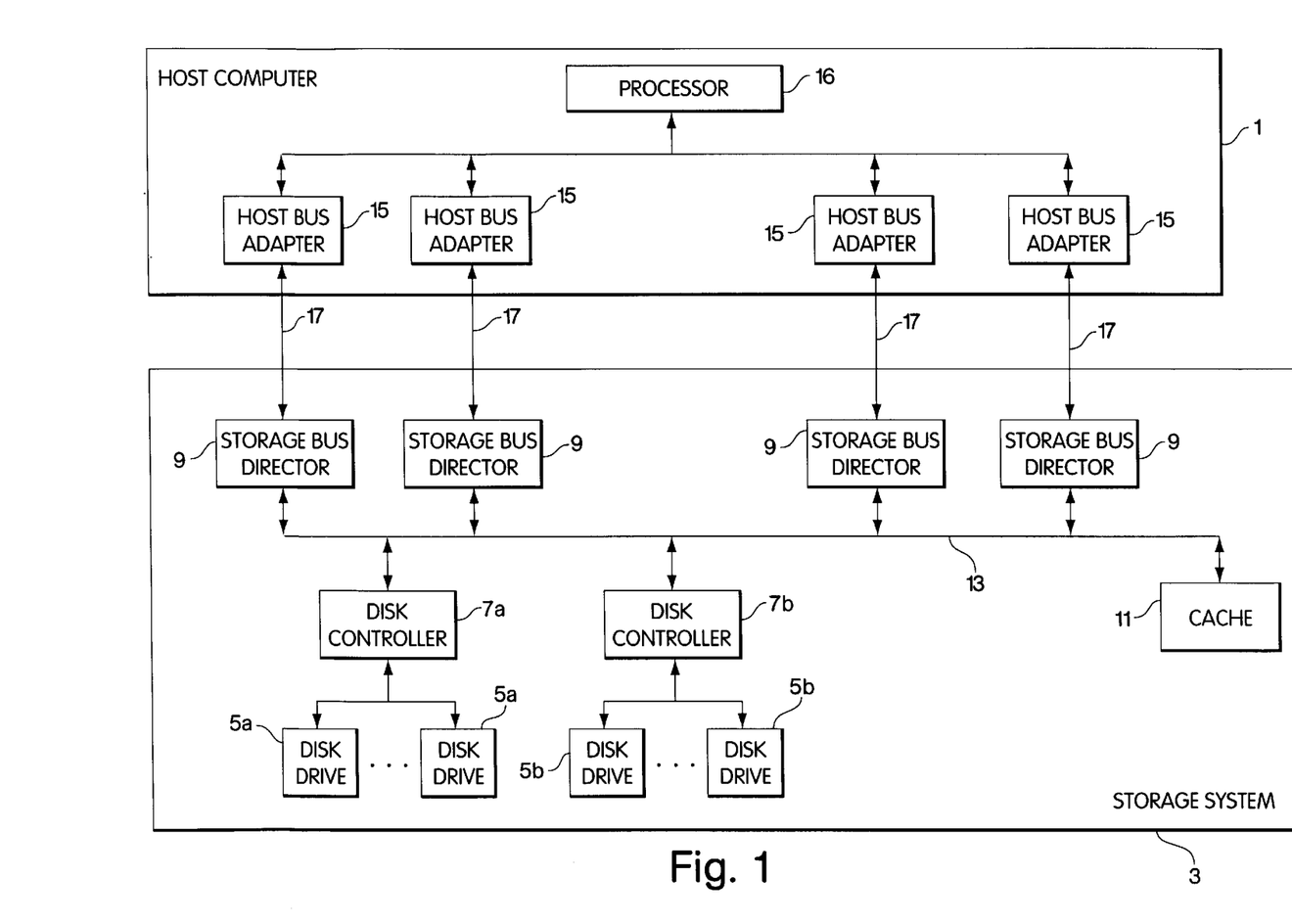
FIG. 1 is a block diagram of an exemplary multi-path computing system on which aspects of the present invention can be implemented.

Many computer systems include one or more host computers and one or more storage systems that store data used by the host computers. An example of such a system is shown in FIG. 1, and includes a host computer 1 and a storage system 3. The storage system typically includes a plurality of storage devices on which data is stored. In the exemplary system shown in FIG. 1, the storage system includes a plurality of disk drives 5a–b, and a plurality of disk controllers 7a–7b that respectively control access to the disk drives 5a and 5b. The storage system 3 further includes a plurality of storage bus directors 9 that control communication with the host computer 1 over communication buses 17. The storage system 3 further includes a cache 11 to provide improved storage system performance. In particular, when the host computer 1 executes a read from the storage system 3, the storage system 3 may service the read from the cache 11 (when the data is stored in the cache), rather than from one of the disk drives 5a–5b, to execute the read more efficiently. Similarly, when the host computer 1 executes a write to the storage system 3, the corresponding storage bus director 9 can execute the write to the cache 11. Thereafter, the write can be destaged asynchronously, in a manner transparent to the host computer 1, to the appropriate one of the disk drives 5a–5b. Finally, the storage system 3 includes an internal bus 13 over which the storage bus directors 9, disk controllers 7a–7b and the cache 11 communicate.

The host computer 1 includes a processor 16 and one or more host bus adapters 15 that each controls communication between the processor 16 and the storage system 3 via a corresponding one of the communication buses 17. It should be appreciated that rather than a single processor 16, the host computer 1 can include multiple processors. Each bus 17 can be any of a number of different types of communication links, with the host bus adapter 15 and the storage bus directors 9 being adapted to communicate using an appropriate protocol for the communication bus 17 coupled therebetween. For example, each of the communication buses 17 can be implemented as a SCSI bus, with the directors 9 and adapters 15 each being a SCSI driver. Alternatively, communication between the host computer 1 and the storage system 3 can be performed over a Fibre Channel fabric.

As shown in the exemplary system of FIG. 1, some computer systems employ multiple paths for communicating between the host computer 1 and the storage system 3 (e.g., each path includes a host bus adapter 15, a bus 17 and a storage bus director 9 in FIG. 1). In many such systems, each of the host bus adapters 15 has the ability to access each of the disk drives 5a–b, through the appropriate storage bus director 9 and disk controller 7a–b. It should be appreciated that providing such multi-path capabilities enhances system performance, in that multiple to communication operations between the host computer 1 and the storage system 3 can be performed simultaneously.

Although the provision of multiple paths between the host computer 1 and the storage system 3 provides for improved system performance, it also results in some increased system complexity, particularly in so-called "open systems". As used herein, the phrase open system is intended to indicate a non-mainframe environment, such that the host computer 1 employs commodity based hardware available from multiple vendors and runs a commodity-based operating system that is also available from multiple vendors. Unlike the mainframe environment, intelligent storage systems such as the storage system 3 shown in FIG. 1 have only recently been used with open systems. Thus, problems have been encountered in implementing an open computer system that includes multiple paths to an intelligent storage system.

For example, conventional host computers 1 in an open system will not recognize that multiple paths have been formed to the same storage device within the storage system. Referring to the illustrative system of FIG. 1, the operating system on the host computer 1 will view the storage system 3 as having four times its actual number of disk drives 5a–b, since four separate paths are provided to each of disk drives 5a–b. To address this problem, conventional host computers in an open system have, as explained below, included an additional mapping layer, below the file system or logical volume manager (LVM), to reduce the number of storage devices (e.g., disk drives 5a–b) visible at the application layer to the number of storage devices that actually exist on the storage system 3.

Figure 2:
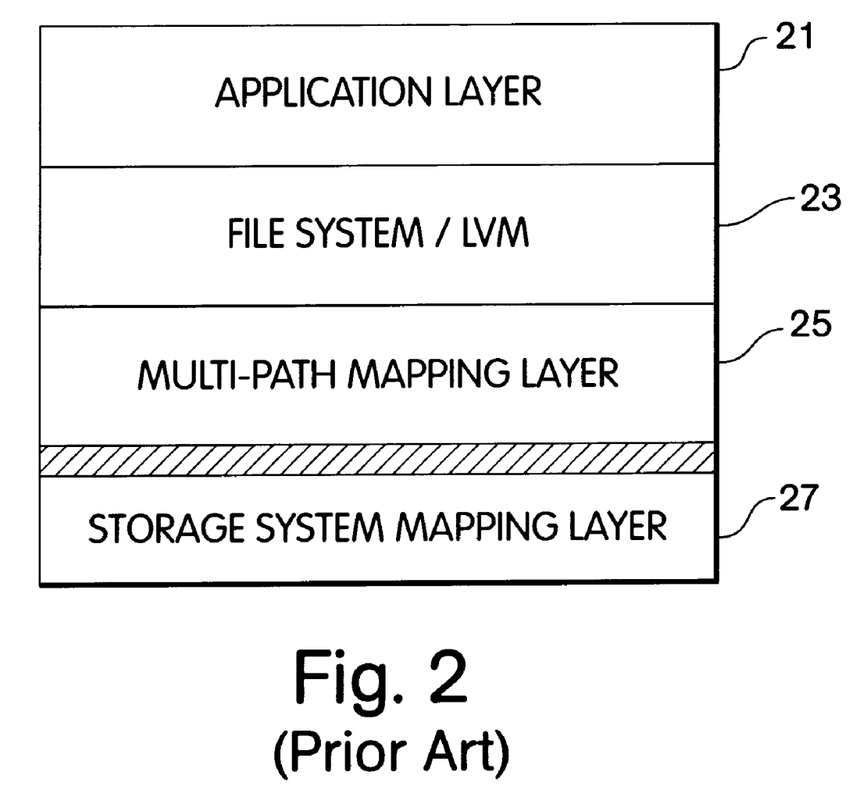
FIG. 2 is a schematic representation of a number of mapping layers that exist in a known multi-path computing system.

FIG. 2 is a schematic representation of a number of mapping layers that may exist in a known multi-path computer system such as the one shown in FIG. 1. The system includes an application layer 21 which includes application programs executing on the processor 16 of the host computer 1. The application layer 21 will generally refer to storage locations used thereby with a label or identifier such as a file name, and will have no knowledge about where the file is physically stored on the storage system 3 (FIG. 1). Below the application layer 21 is a file system and/or a logical volume manager (LVM) 23 that maps the label or identifier specified by the application layer 21 to a logical volume that the host computer perceives to correspond directly to a physical device address (e.g., the address of one of the disk drives 5a–b) within the storage system 3. Below the file system/LVM layer 23 is a multi-path mapping layer 25 that maps the logical volume address specified by the file system/LVM layer 23, through a particular one of the multiple system paths, to the logical volume address to be presented to the storage system 3. Thus, the multi-path mapping layer 25 not only specifies a particular logical volume address, but also specifies a particular one of the multiple system paths to access the specified logical volume.

If the storage system 3 were not an intelligent storage system, the logical volume address specified by the multi-pathing layer 25 would identify a particular physical device (e.g., one of disk drives 5a–b) within the storage system 3. However, for an intelligent storage system such as that shown in FIG. 1, the storage system itself may include a further mapping layer 27, such that the logical volume address passed from the host computer 1 may not correspond directly to an actual physical device (e.g., a disk drive 5a–b) on the storage system 3. Rather, a logical volume specified by the host computer 1 can be spread across multiple physical storage devices (e.g., disk drives 5a–b), or multiple logical volumes accessed by the host computer 1 can be stored on a single physical storage device.

It should be appreciated from the foregoing that the multi-path mapping layer 25 performs two functions. First, it controls which of the multiple system paths is used for each access by the host computer 1 to a logical volume. Second, the multi-path mapping layer 25 also reduces the number of logical volumes visible to the file system/LVM layer 23. In particular, for a system including X paths between the host computer 1 and the storage system 3, and Y logical volumes defined on the storage system 3, the host bus adapters 15 see X times Y logical volumes. However, the multi-path mapping layer 25 reduces the number of logical volumes made visible to the file system/LVM layer 23 to equal only the Y distinct logical volumes that actually exist on the storage system 3.

In a known multi-pathing system as described above in connection with FIGS. 1–2, the operating system executing on the processor 16 in the host computer 1 is required to manage (e.g., at the multi-path mapping layer 25) a number of logical volumes that is equal to the number of logical volumes that the host computer 1 would perceive the storage system 3 as storing if multi-pathing where not employed (Y in the example above), multiplied by the number of paths (e.g., X in the example above and four in FIG. 1) between the host computer 1 and the storage system 3. Referring to the illustrative system of FIG. 1, assuming the storage system 3 includes a total of twenty disk drives 5a–b that each corresponds directly to a single logical volume, and the four paths 17 between the host computer 1 and the storage system 3, the operating system on the processor 16 would need to manage eighty logical volumes. In this respect, a unique label is generated for each independent path to a logical volume. Thus, for each of the twenty logical volumes present on the storage system 3, four unique labels will be generated, each specifying a different path (e.g., through an adapter 15, a bus 17 and a director 9) to the logical volume. These unique labels are used during multi-path operation to identify through which path an operation on the host computer 1 directed to a particular logical volume is to be executed.

Figure 3:
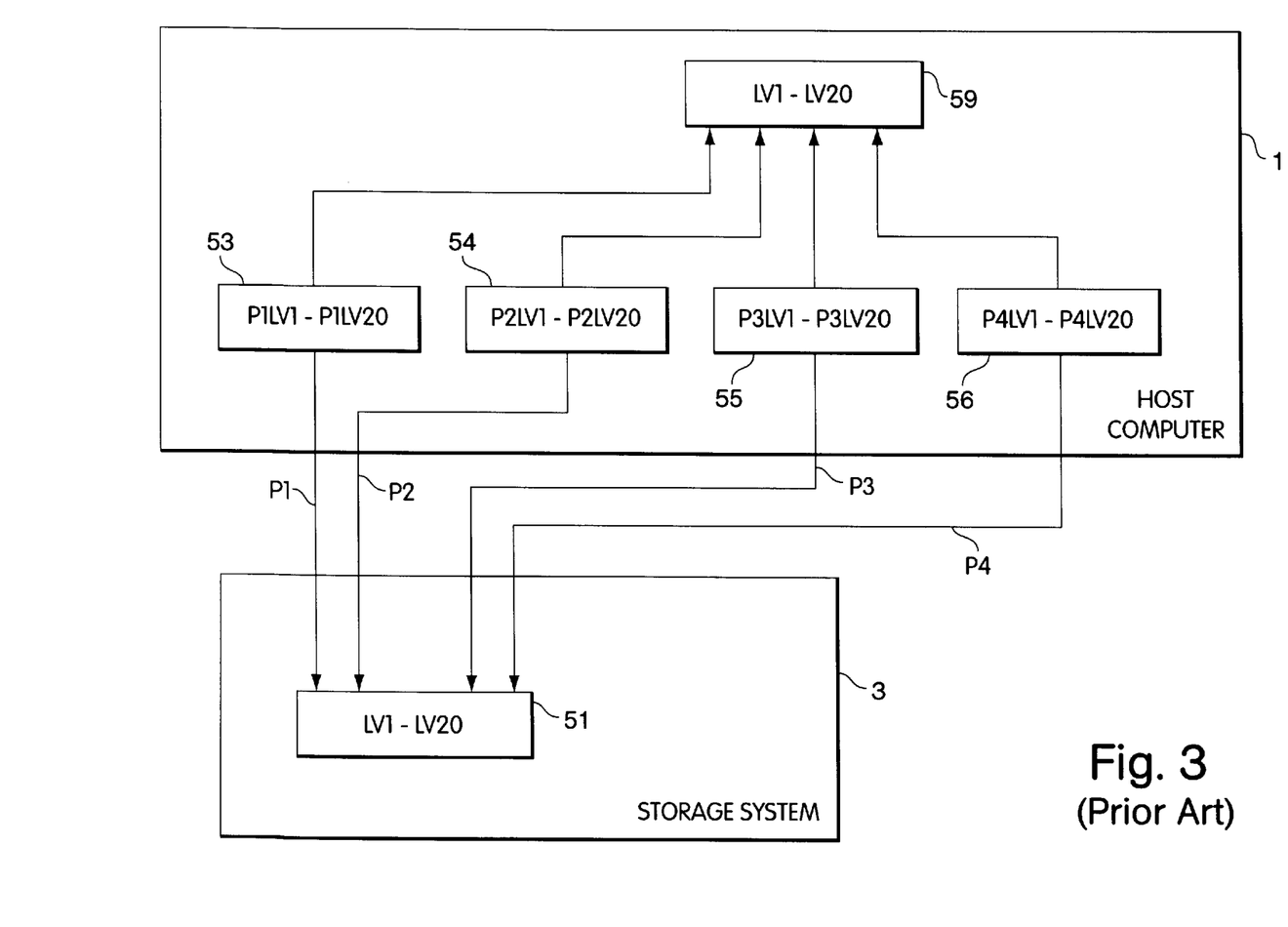
FIG. 3 is a conceptual illustration of the manner in which logical volumes are managed in a prior art multi-path computing system.

FIG. 3 is a conceptual representation of the manner in which complexity is introduced into the host computer 1 due to the use of multiple paths P1–P4. In the example shown in FIG. 3, the storage system 3 includes twenty logical volumes 51, labeled LV1–LV20. As shown in FIG. 3, the host computer 1 includes four separate groups of labels 53–56 for each group of logical volumes LV1–LV20. These groups of labels are identified as P1LV1–P1LV20, P2LV1–P2LV20, P3LV1–P3LV20 and P4LV1–P4LV20 to indicate that there are four separate paths (i.e., P1–P4) to each of the groups of logical volumes LV1–LV20. Finally, as shown in FIG. 3, the multi-path mapping layer 25 (FIG. 2) consolidates the four groups of labels 53–56 to represent only the twenty unique logical volumes LV1–LV20 at 59, so that the file system/ LVM layer 23 sees the correct number of logical volumes actually present on the storage system 3.

The manner in which the known multi-path system described above is implemented presents two independent but related problems. First, it should be appreciated that the operating system for a typical processor 16 maintains a number of resources to manage the target devices that it recognizes as coupled to the adapters 15 at the host computer. For many processors, particularly when the host computer 1 is an open system, these resources are limited. Thus, there is a constraint on the number of target devices that the operating system will support (e.g., the operating system will simply not boot if the total number of target devices exceeds the number supported). For example, the NT operating system has a limit of approximately four-hundred arget devices, and thirty-two target devices per path. It should be immediately apparent that implementing the multi-path system in the manner described above places severe limitations on the type of system that can be configured. For example, since the total number of target devices that the operating system must support is equal to the number of actual logical volumes multiplied by the number of paths in the above-described system, a trade off is encountered between the total number of paths and the total number of logical volumes that can be employed. Although in the example described above the number of paths is equal to four and the number of logical volumes is equal to twenty, it should be appreciated that in an actual system, it is generally desirable to employ significantly more paths (e.g., thirty-two or greater) and significantly more logical volumes. In fact, it is often desirable to employ a system including a number of logical volumes and a number of paths that, when multiplied together, would greatly exceed the limit of four hundred imposed by the NT operating system. Thus, implementing the multi-path system in the manner described above places limitations on both the number of actual logical volumes that can be employed in the system, and the number of paths that can be employed.

A second related problem is that multiplying the number of logical volumes by the number of paths can result in an extremely large number of target devices to be managed by the operating system, which can result in an extremely long boot time when initializing the host computer 1. Thus, even if the operating system on the processor 16 includes a satisfactorily large limit on the total number of target devices that can be supported, the implementation of the multi-path system in the manner described above can result in extremely long boot times for the host computer 1.

SUMMARY OF THE INVENTION

One illustrative embodiment of the invention is directed to a method of managing a plurality of logical volumes in a computer system, the computer system including a processor and a storage system coupled to the processor, the storage system including at least one storage device, the storage system storing the plurality of logical volumes on the at least one storage device. The method comprises steps of: (A) combining, in the storage system, at least two of the plurality of logical volumes into a virtual volume that includes the at least two of the plurality of logical volumes; (B) presenting the virtual volume to the processor as a single logical volume; and (C) presenting the processor with information that enables the processor to deconstruct the virtual volume into the at least two of the plurality of logical volumes.

Another illustrative embodiment of the invention is directed to a storage system for use in a computer system including a processor coupled to the storage system. The storage system comprises at least one storage device to store a plurality of logical volumes; and a controller to combine at least two of the plurality of logical volumes into a virtual volume that includes the at least two of the plurality of logical volumes, to present the virtual volume to the processor as a single logical volume, and to further present the processor with information that enables the processor to deconstruct the virtual volume into the at least two of the plurality of logical volumes.

A further illustrative embodiment of the invention is directed to a host computer for use in a computer system including a storage system coupled to the host computer. The storage system includes at least one storage device to store a plurality of logical volumes, combines at least two of the plurality of logical volumes into a virtual volume and presents the virtual volume to the processor as a single logical volume. The host computer comprises a processor and means for deconstructing the virtual volume into the at least two of the plurality of logical volumes.

Another illustrative embodiment of the invention is directed to a multi-path computer system comprising: a processor; a storage system including at least one storage device to store a plurality of logical volumes, the plurality of logical volumes including at least Y logical volumes; and a plurality of paths coupling the processor to the storage system, the plurality of paths including X paths coupling the processor to the storage system. The processor is capable of accessing each of the Y logical volumes through each of the X paths, and wherein the processor includes Z unique target address identifiers identifying the Y logical volumes, wherein Z is less than X times Y.

A further illustrative embodiment of the invention is directed to a host computer for use in a multi-path computer system including a storage system having at least one storage device to store a plurality of logical volumes, the plurality of logical volumes including at least Y logical volumes. The multi-path computer system further includes X paths coupling the host computer to the storage system. The processor comprises a processor capable of accessing each of the Y logical volumes through each of the X paths, the processor including Z unique target address identifiers identifying the Y logical volumes, wherein Z is less than X times Y.

DETAILED DESCRIPTION

In accordance with one illustrative embodiment of the present invention, an improved method and apparatus for implementing a multi-path system is provided. In one embodiment of the present invention, the logical volumes implemented on the storage system (e.g., storage system 3 of FIG. 1) are merged into a relatively small number of larger virtual volumes that are presented to the host computer. In this manner, the number of target devices that the operating system on the host computer must manage is significantly reduced. The storage system can also provide information to the host computer that enables it to deconstruct each of the larger virtual volumes in a manner described below.

In the examples discussed below, the aspects of the present invention are employed with an open system, and with a storage device that includes a plurality of disk drives. However, it should be appreciated that the present invention is not limited in this respect. The present invention can be employed with any type of storage system (e.g., tape drives, etc.) and is not limited to use with a disk drive storage system. Similarly, although the aspects of the present invention discussed below are particularly advantageous for use in connection with open systems, the present invention is not limited in this respect, as aspects of the present invention can also be employed in a mainframe environment.

Figure 4:
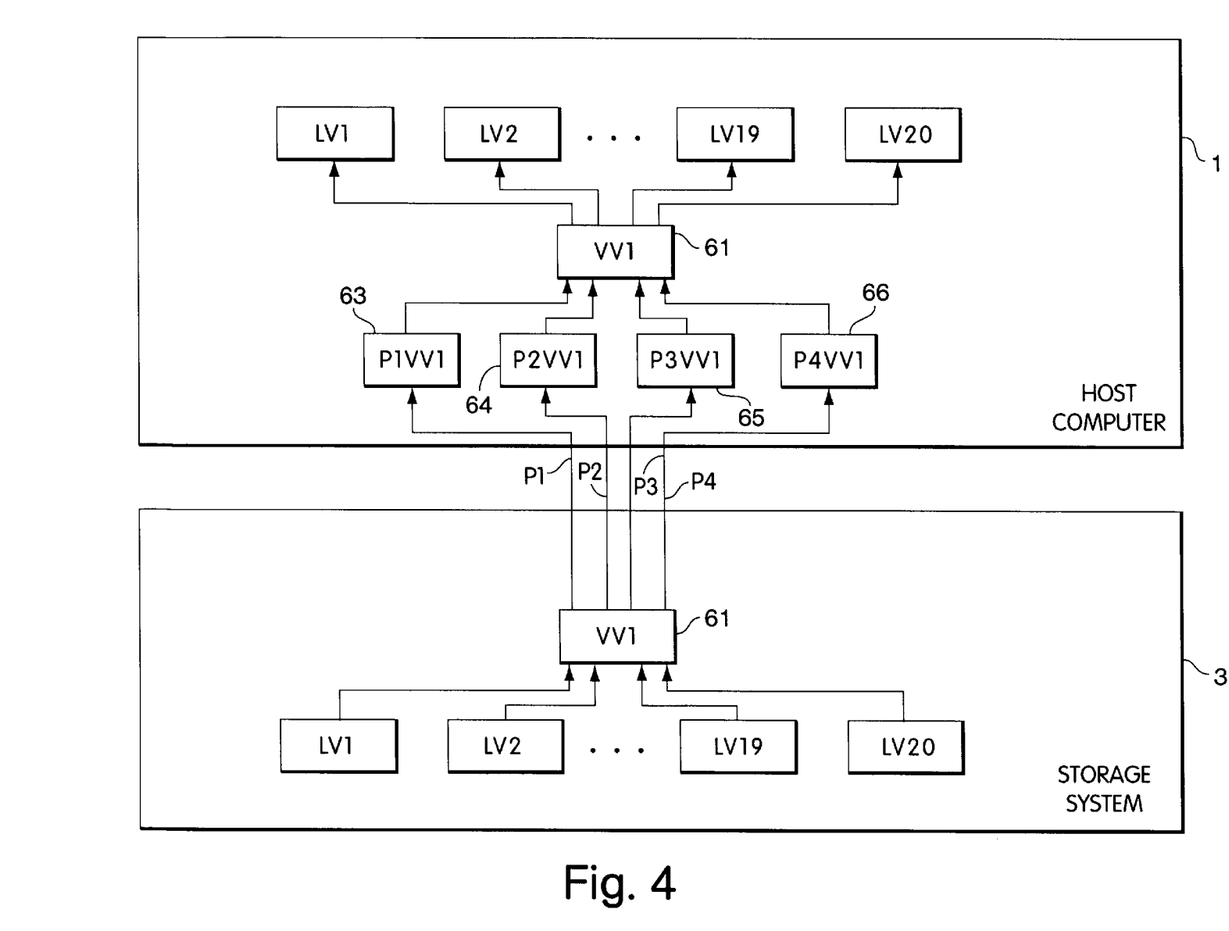
FIG. 4 is a conceptual illustration of the manner in which logical volumes are managed according to a virtual volume aspect of the present invention.

FIG. 4 is a conceptual diagram of the manner in which a virtual volume is employed in accordance with one exemplary embodiment of the present invention, using the same example described above in connection with FIG. 1, wherein the computer system includes four paths (P1–P4) between the host computer 1 and the storage system 3, and wherein the storage system includes twenty logical volumes (i.e., LV1–LV20). In accordance with one embodiment of the present invention, multiple logical volumes LV1–LV20 are combined in the storage system 3 into a larger virtual volume 61, labeled in FIG. 4 as VV1. The single virtual volume 61 then is presented to the host computer 1 over each of the four paths P1–P4, rather than having the twenty logical volumes LV1–LV20 that make up VV1 presented separately to the host computer over each of these paths. Therefore, the host computer 1 sees only four target devices 63–66, respectively labeled as P1VV1 through P4VV1 in FIG. 4 to indicate that the virtual volume VV1 is visible over each of the paths P1–P4. In the host computer 1, the four target volumes 64–66 are combined to form a single representation of the virtual volume 61 (i.e., VV1 ) to reflect that the same virtual volume is perceived by the host computer 1 over each of the paths P1–P4. This consolidation process is similar to that performed by the multi-path mapping layer 25 in the known system discussed above in connection with FIG. 2.

The storage system 3 also provides the host computer 1 with information relating to the structure of the virtual volume VV1. This information enables the host computer 1 to deconstruct the virtual volume into the logical volumes LV1–LV20 that comprise it. The deconstructed logical volumes LV1–LV20 can then be presented to the file system/LVM layer 23 (FIG. 5 discussed below) in much the same manner as would be done if no multi-pathing or virtual volume mapping were employed and the logical volumes LV1–LV20 within the storage system 3 were simply presented over a single path to the host computer 1. Thus, although the logical volumes LV1–LV20 are presented to the host computer 1 as a single virtual volume VVI, the host computer is able to deconstruct the virtual volume and thereafter access the logical volumes LV1–LV20 independently, rather than having to access all of the logical volumes LV1–LV20 together as part of the virtual volume VV1

Figure 5:
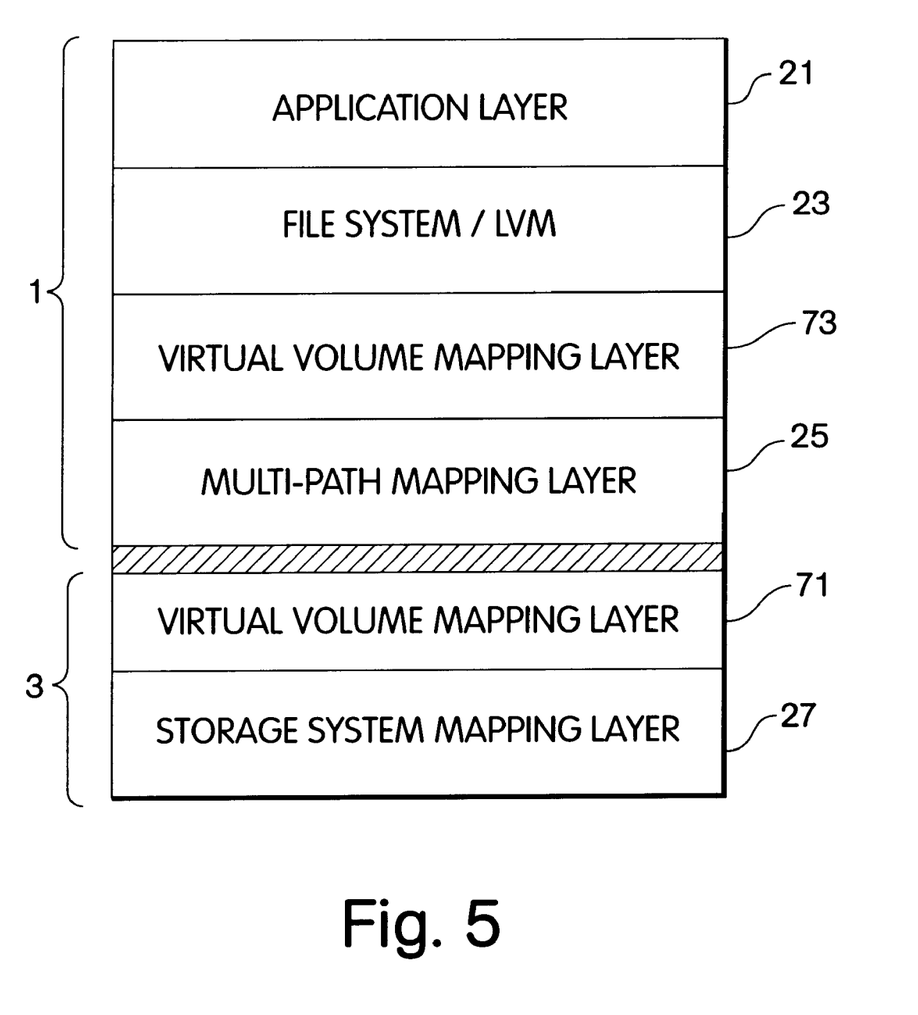
FIG. 5 is a schematic representation of a number of mapping layers that can be employed to implement the virtual volume aspect of the present invention.

FIG. 5 is a schematic representation of a number of mapping layers that may exist in a multi-path computer system that employs the virtual volume aspect of the present invention described in connection with FIG. 4. As with the known system described above in connection with FIG. 2, a computer system employing the virtual volume aspect of the present invention may include an application layer 21, a file system and/or LVM layer 23, and a storage system mapping layer 27 that each performs functions similar to those described above in connection with FIG. 2. In addition, within the storage system 3 is a virtual volume mapping layer 71 that performs the function of mapping between the larger virtual volume 61 (i.e., VV1) and the logical volumes LV1–LV20 that comprise it. For example, in the example discussed above, the virtual volume mapping layer 71 performs the function of combining the twenty logical volumes LV1–LV20 into the virtual volume VV1. A virtual volume mapping layer 73 is also provided in the host computer 1 to map between the virtual volume and the logical volumes that comprise it. For example, the mapping layer 73 will make use of the information provided by the storage system 3 (FIG. 1) as to the structure of the virtual volume to deconstruct the virtual volume into the logical volumes that comprise it. Finally, the system also includes a multi-path mapping layer 25 that is similar in many respects to that described in connection with FIG. 2, and that maps between the multiple target devices 63–66 (FIG. 4) corresponding to the multiple paths P1–P4 and the single reconstructed representation of the virtual volume 61.

It should be appreciated that the virtual volume aspect of the present invention provides a number of advantages when used in conjunction with a multi-path computer system such as that shown in FIG. 1. In particular, the virtual volume aspect of the present invention significantly reduces the number of target devices (e.g., 63–66 in FIG. 4) that must be managed by the operating system on the host computer 1. This can significantly reduce the initialization time for the computer system, since as described above, the necessity of managing a large number of target devices can significantly slow down the boot time of the system. In addition, reducing the number of target devices that the operating system of the host computer 1 must manage greatly increases flexibility in possible system configurations, particularly for host computers with operating systems that have strict constraints on the number of target devices that can be managed. In particular, by reducing the total number of target devices that the operating system of the host computer 1 must support, the virtual volume aspect of the present invention can enable the use of a greater number of paths between the host computer 1 and the storage system 3, a greater number of logical volumes provided per path, a greater total number of logical volumes on the storage system 3 that are useable by the host computer 1, or all of the above.

The advantages of using the virtual volume aspect of the present invention in connection with a multi-path system should be immediately apparent from the foregoing, and are highlighted by a comparison of the conceptual illustrations of the prior art system of FIG. 3 and the virtual volume system of FIG. 4. For the illustrative example shown wherein the storage system includes twenty logical volumes and the computer system includes four paths, the prior art system illustrated in FIG. 3 creates eighty distinct labels represented at 53–56 for the eighty target devices that the host computer 1 perceives as available over its four paths P1–P4. By contrast, using the virtual volume aspect of the present invention shown in FIG. 4, the host computer creates only four labels for four distinct target devices 63–66. As discussed above, this reduction in the number of target device labels can significantly reduce the boot or initialization time of the host computer 1, and can further enable the system to boot with and use a greater number of paths and/or logical volumes in the multi-path computing system.

It should be appreciated that the advantages in employing the virtual volume aspect of the present invention increase in proportion to the number of logical volumes and/or the number of paths employed in the multi-path computing system. For example, for an exemplary system such as that shown in FIG. 1 that employs one hundred twenty (120) logical volumes and eight separate paths between the host computer and the storage system, employing the known system illustrated in FIG. 3 requires that the operating system on the host computer initialize nine hundred sixty (960) distinct target device labels. It has been found that initializing such a system can take approximately five hours. This is a significant increase in the boot time for the system over what would be required if multiple paths were not employed between the host computer 1 and the storage system 3. Thus, a disincentive is provided to implementing a multi-path system using the known system shown in FIG. 3. Conversely, using the virtual volume aspect of the present invention shown in FIG. 4, if all one hundred twenty (120) of the logical volumes are combined into a single virtual volume, the operating system on the host computer 1 need only create eight distinct target device labels to support the multi-path configuration, which has a de minis impact on the initialization time of the system. Thus, using the virtual volume aspect of the present invention enables a multi-path system to be implemented without significantly increasing the system boot time.

It should be appreciated from the foregoing that in addition to the unique labels generated for the target devices 63–66 in the illustrative example of FIG. 4, the virtual volume aspect of the present invention will also result in the generation of a unique label for the single representation of the virtual volume 61 (i.e., VV1) in the host computer, as well as unique labels for the deconstructed logical volumes LV1–LV20 that comprise it. These labels are respectively created by the multi-path mapping layer 25 (FIG. 5) and the virtual volume mapping layer 73, and are not created by the operating system at boot time, so that the creation of these labels does not increase the initialization time for the system. In addition, even with the creation of these additional labels, it should be appreciated that the total number of labels created within the host computer 1 when employing the virtual volume aspect of the present invention is not significantly greater than in a system wherein multi-pathing was not employed. For example, for the illustrative system discussed above in which one hundred twenty (120) logical volumes are provided along with eight paths, if a single virtual volume were created to include all one hundred twenty (120) logical volumes, a total of eight unique target device addresses would be generated by the operating system, a single virtual volume identifier would be created by the multi-path mapping layer 25, and then one hundred twenty (120) unique labels would be created for the deconstructed logical volumes by the virtual volume mapping layer 73. In this respect, the number of additional labels created as compared to a single-path system is simply equal to the number of multiple paths employed, plus one when a single virtual volume is created for all of the logical volumes in the system.

In addition to the reduction in the initialization time for the system, it should be appreciated that the use of the virtual volume aspect of the present invention also significantly reduces the number of target device addresses that the operating system on the host computer must support for a system including multiple paths. As mentioned above, this enables greater flexibility in terms of system configuration with respect to the number of logical volumes and multiple paths that can be supported. This is particularly important for multi-path systems that include relatively large numbers of multiple paths. In this respect, it is contemplated that the aspects of the present invention can be employed in a multi-path system that includes more than simply two paths, and that can include three, four or any greater number (e.g., thirty-two or more) of paths.

In accordance with another embodiment of the present invention, the virtual volume aspect of the present invention is employed to provide the host computer 1 with the capability of dynamically changing the configuration of the storage system 3 without rebooting the host computer 1. It should be appreciated that in conventional systems, adding or removing a target device (e.g., a disc drive 5a–c in FIG.

1 or a logical volume LV1 in FIG. 3) from the storage system 3 requires that the host computer be rebooted, because each target device is managed directly by the operating system of the processor 16. Conversely, in accordance with the virtual volume aspect of the invention, it is only the virtual volumes (e.g., 63–66 in FIG. 4) that are managed by the operating system. The target devices are managed by the virtual volume mapping layer 73 (FIG. 5). Thus, in accordance with one aspect of the present invention, a target device (e.g., LV2 in FIG. 4) can be added or removed from the storage system 3 without requiring that the host computer 1 be rebooted, because the target devices are managed by the virtual volume mapping layer 73 (FIG. 5) rather than by the operating system. This provides the host computer 1 with the capability of dynamically changing the configuration of the storage system 3 without rebooting the host computer 1.

The virtual volume aspect of the present invention also provides a significant advantage in a system wherein the resources of the storage system 3 are shared by two or more host computers. An example of such a system might employ a Fibre Channel fabric to connect each of multiple host computers to the storage system. In such a system, certain target devices (e.g., logical volumes) within the storage system 3 typically are dedicated to a subset (e.g., a single one) of the host computers, such that access to those target devices is denied from the other host computers coupled to the storage system. Thus, some type of volume configuration management is typically employed to partition the target devices on the storage system 3 into subsets with different access privileges. Multi-path systems complicate this volume configuration management because access to the target devices within the storage system 3 must be managed across each of the multiple paths. In accordance with one aspect of the present invention, the above-described virtual volume techniques can be employed to group together the subsets of the target devices that are to be managed in the same way (i.e., which share common access privileges amongst the one or more host computers) into a single virtual volume. In this manner, access from the multiple host computers to the target devices can be managed by a volume configuration management scheme that deals only with a small number of virtual volumes, thereby simplifying this management process.

The virtual volume aspect of the present invention is not limited to presenting all of the logical volumes within the storage device 3 to the host computer 1 in a single virtual volume. In this respect, it should be appreciated that the benefits of the virtual volume aspect of the present invention can be achieved by presenting a virtual volume to the host computer that includes less than the entire set of logical volumes supported by the storage system 3. Including any number of two or more logical volumes in a virtual volume provides the advantages discussed above by reducing the number of target device labels that the operating system on the host computer 1 must support. Thus, it is contemplated that a virtual volume can be created for a subset of the logical volumes included on the storage system 3, while other logical volumes on the storage system can be presented directly to the host computer 1, without being included in a larger virtual volume. Furthermore, it is also contemplated that multiple virtual volumes can be presented to the host computer 1 simultaneously, with each virtual volume corresponding to a subset of the logical volumes within the storage system 3. For example, distinct virtual volumes can be created for different volume groups within the storage system 3, wherein each volume group can be associated with a particular application executing on the host computer 1.

The virtual volume aspect of the present invention can be implemented in any of numerous ways, and the present invention is not limited to any particular method of implementation. In accordance with one embodiment of the present invention, the virtual volumes are created using a "metavolume" that is created in the cache 11 in a storage system such as that shown in FIG. 1. The SYMMETRIX line of disk arrays available from EMC Corporation, Hopkinton, Mass. support the creation of metavolumes in a storage system cache such as the cache 11 shown in FIG. 1. A metavolume is employed to concatenate together a plurality of logical volumes (or "hyper-volumes" as discussed below) to form a single large metavolume that looks to the host computer 1 like a single logical volume. Thus, a virtual volume in accordance with the present invention can be implemented, for example, by forming a metavolume in the cache 11 of the storage system 3, with the metavolume including each of the logical volumes to be included in the virtual volume.

Although the metavolume technology provides a convenient way of implementing a virtual volume, it should be appreciated that the present invention is not limited in this respect, and that a virtual volume can be implemented in numerous other ways. For example, although the metavolume technology conveniently makes use of the cache 11 to form a metavolume, it should be appreciated that the present invention is not limited to employing a cache to form the virtual volume, and is not even limited to use with a storage system that includes a cache. In addition, it should be appreciated that although the metavolume technology provides a useful way to implement the virtual volume according to the present invention, there is a significant difference between a metavolume and a virtual volume. In particular, in known systems that have implemented a metavolume, the metavolume is presented to the host computer 1 simply as a single large logical volume. The host computer has no knowledge about the structure of the metavolume (i.e., of what logical volumes or hyper-volumes make-up the metavolume), and therefore, the host computer simply treats the metavolume as a single large logical volume. By contrast, as described above, the virtual volume aspect of the present invention provides not only a large concatenated volume to the host computer, but also provides the host computer with information relating to the structure of the virtual volume, so that the host computer 1 can deconstruct the virtual volume in the manner shown conceptually in FIG. 4 and can access each of its constituent logical volumes independently.

It should be appreciated that when metavolume technology is employed to form a virtual volume, the virtual volume can be formed by concatenating together not only logical volumes and/or hyper-volumes, but also metavolumes that will form a subset of the larger virtual volume and which will not be deconstructed by the host computer. Thus, when the virtual volume is deconstructed by the host computer, any metavolumes that make up the virtual volume will remain intact. The host computer will be provided with information relating to the structure of the virtual volume, so that the host computer 1 can deconstruct the virtual volume into each of its constituent logical volumes, hyper-volumes and metavolumes. However, the host computer will not be provided with information concerning the internal structure of any metavolumes that make up the virtual volume.

It should be appreciated that each of the layers in the system shown in FIG. 5 can be implemented in numerous ways. The present invention is not limited to any particular manner of implementation. The application 21 and file system/LVM 23 layers are typically implemented in software that is stored in a memory (not shown) in the host computer and is executed on the processor 16. The virtual volume mapping layer 73 and the multi-path mapping layer 25 can also be implemented in this manner. Alternatively, the mapping layers 25, 73 can be implemented in the host bus adapters 15. For example, the adapters can each include a processor (not shown) that can execute software or firmware to implement the mapping layers 25, 73. The virtual volume mapping layer 71 can be implemented in the storage bus directors 9 in the storage system. For example, the directors can each include a processor (not shown) that can execute software or firmware to implement the mapping layer 71. Finally, the storage system mapping layer 27 can be implemented in the storage bus directors 9 or disk controllers 7a–b in the storage system. For example, the disk controllers 7a–b can each include a processor (not shown) that can execute software or firmware to implement the mapping layer 27.

In accordance with a further embodiment of the present invention, the virtual volume is created by concatenating together not only logical volumes that each corresponds to a physical storage device (e.g., disk drives 5a–b in FIG. 1) in the storage system 3, but by concatenating together "hyper-volumes". Many storage systems support the splitting of a single physical storage device such as a disk drive into two or more logical storage devices or drives, referred to as hyper-volumes by EMC Corporation, and as luns in conventional RAID array terminology. The use of hyper-volumes is advantageous in that it facilitates management of the hyper-volumes within the storage system 3, and in particular within the cache 11. In this respect, it should be appreciated that the cache 11 will typically include a particular number of cache slots dedicated to each logical volume or hyper-volume. By employing hyper-volumes, the cache 11 can manage a smaller volume of information, which may result in fewer collisions within the cache slots dedicated to each hyper-volume than might occur if the cache was organized using larger volume boundaries.

In accordance with another embodiment of the present invention, the virtual volume aspect of the present invention is employed to provide tremendous flexibility at the host computer 1 with respect to the manner in which the storage system 3 can be configured. This flexibility is enhanced further through the use of hyper-volumes to form a virtual volume. In this respect, the virtual volume can be formed by a concatenation of numerous hyper-volumes that are not constrained to correspond to an entire one of the physical storage devices (e.g., disk drives 5a–b). Thus, the virtual volume can be formed by a concatenation of numerous smaller hyper-volumes, and the information regarding the structure of the virtual volume can be passed to the host computer 1. In accordance with one embodiment of the present invention, the host computer 1 has the capability of dynamically changing the configuration of the storage system 3 in any of numerous ways. Thus, the host computer 1 can add or delete hyper-volumes to a particular volume set visible by the file system/LVM layer 23, can change the size of the volume visible at that layer, etc. In addition, the storage system 3 is provided with the capability of presenting a representation to the host computer 1 of any type of configuration desired, including a representation of the storage system as including a small number of relatively large virtual volumes, while the storage system 3 is able to manage much smaller volumes of data (e.g., hyper-volumes) internally to maximize the efficiency of the storage system 3.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of managing a plurality of logical volumes in a computer system, the computer system including a processor and a storage system coupled to the processor, the storage system including at least one storage device, the storage system storing the plurality of logical volumes on the at least one storage device, the method comprising steps of:

(A) combining, in the storage system, at least two of the plurality of logical volumes into a virtual volume that includes the at least two of the plurality of logical volumes;

(B) presenting the virtual volume to the processor as a single logical volume; and (C) presenting the processor with information that enables the processor to deconstruct the virtual volume into the at least two of the plurality of logical volumes.

2. The method of claim 1, wherein the computer system is a multi-path computer system including a plurality of paths coupling the processor to the storage system, and wherein the step (B) includes a step of presenting the virtual volume to the processor over each of the plurality of paths.

3. The method of claim 1, wherein the computer system is a multi-path computer system including at least three paths coupling the processor to the storage system, and wherein the step (B) includes a step of presenting the virtual volume to the processor over each of the at least three paths.

4. The method of claim 1, wherein the storage system includes a cache, and wherein the step (A) includes a step of combining the at least two of the plurality of logical volumes into the virtual volume in the cache.

5. The method of claim 1, wherein the step (A) includes steps of:

subdividing the at least one storage device to form each of the at least two of the plurality of logical volumes, so that each of the at least two of the plurality of logical volumes is a hyper-volume; and combining the hyper-volumes into the virtual volume.

6. The method of claim 1, wherein:

the step (A) includes a step of combining, in the storage system, a first pair of the plurality of logical volumes into a first virtual volume that includes the first pair of the plurality of logical volumes, and a step of combining, in the storage system, a second pair of the plurality of logical volumes into a second virtual volume that includes the second pair of the plurality of logical volumes;

the step (B) includes a step of presenting each of the first and second virtual volumes to the processor as a single logical volume; and the step (C) includes a step of presenting the processor with information that enables the processor to deconstruct the first and second virtual volumes, respectively, into the first and second pairs of the plurality of logical volumes.

7. The method of claim 1, further including a step of:

(D) deconstructing, in the processor, the virtual volume into the at least two of the plurality of logical volumes.

8. The method of claim 7, further including a step of:

(E) independently accessing, from the processor, the at least two of the plurality of logical volumes.

9. The method of claim 1, wherein the computer system is an open computer system, and wherein the method further includes a step of:
   (D) deconstructing, in the processor, the virtual volume into the at least two of the plurality of logical volumes.

10. The method of claim 1, wherein the computer system is a multi-path computer system including X paths coupling the processor to the storage system, wherein the step (A) includes a step of combining Y of the plurality of logical volumes into the virtual volume, wherein the processor is capable of accessing each of the Y logical volumes through each of the X paths, and wherein the method further includes a step of:
   generating Z unique target address identifiers corresponding to the Y logical volumes, wherein Z is less than X times Y.

11. The method of claim 10, further including a step of accessing, from the processor, each of the Y logical volumes through each of the X paths.

12. The method of claim 4, wherein the step (A) includes steps of:
   subdividing the at least one storage device to form each of the at least two of the plurality of logical volumes, so that each of the at least two of the plurality of logical volumes is a hyper-volume; and
   combining the hyper-volumes into the virtual volume.

13. The method of claim 1, further including a step of merging, in the processor, the plurality of presentations of the virtual volume over the plurality of paths to form a single representation of the virtual volume in the processor.

14. The method of claim 13, further including a step of:
   (D) deconstructing, in the processor, the single representation of the virtual volume into the at least two of the plurality of logical volumes.

15. A storage system for use in a computer system including a processor coupled to the storage system, the storage system comprising:
   at least one storage device to store a plurality of logical volumes; and
   a controller to combine at least two of the plurality of logical volumes into a virtual volume that includes the at least two of the plurality of logical volumes, to present the virtual volume to the processor as a single logical volume, and to further present the processor with information that enables the processor to deconstruct the virtual volume into the at least two of the plurality of logical volumes.

16. The storage system of claim 15, wherein the storage system includes a plurality of ports for use in a multi-path computer system including a plurality of paths coupling the processor to the storage system, and wherein the controller presents the virtual volume to the processor over each of the plurality of ports.

17. The storage system of claim 15, wherein the storage system includes at least three ports for use in a multi-path computer system including at least three paths coupling the processor to the storage system, and wherein the controller presents the virtual volume to the processor over each of the three ports.

18. The storage system of claim 15, further including a cache, and wherein the controller combines, in the cache, the at least two of the plurality of logical volumes into the virtual volume.

19. The storage system of claim 15, wherein the at least one storage device includes a plurality of storage devices, wherein the storage system further includes means for subdividing one of the plurality of storage devices to form each of the at least two of the plurality of logical volumes, so that each of the at least two of the plurality of logical volumes is a hyper-volume, and wherein the controller combines the hyper-volumes into the virtual volume.

20. The storage system of claim 15, wherein the controller includes:
   means for combining a first pair of the plurality of logical volumes into a first virtual volume that includes the first pair of the plurality of logical volumes, and for combining a second pair of the plurality of logical volumes into a second virtual volume that includes the second pair of the plurality of logical volumes;
   means for presenting each of the first and second virtual volumes to the processor as a single logical volume; and
   means for presenting the processor with information that enables the processor to deconstruct the first and second virtual volumes, respectively, into the first and second pairs of the plurality of logical volumes.

21. The storage system of claim 15, in combination with the processor to form the computer system, wherein the processor includes means for deconstructing the virtual volume into the at least two of the plurality of logical volumes.

22. The combination of claim 21, wherein the processor includes means for independently accessing the at least two of the plurality of logical volumes.

23. The combination of claim 21, wherein the computer system is an open computer system.

24. The storage system of claim 15, in combination with the processor to form the computer system, wherein the computer system is a multi-path computer system including X paths coupling the processor to the storage system, wherein the controller combines Y of the plurality of logical volumes into the virtual volume, wherein the processor is capable of accessing each of the Y logical volumes through each of the X paths, and wherein the processor generates Z unique target address identifiers corresponding to the Y logical volumes, wherein Z is less than X times Y.

25. The combination of claim 24, wherein the processor includes means for accessing each of the Y logical volumes through each of the X paths.

26. The storage system of claim 18, wherein the at least one storage device includes a plurality of storage devices, wherein the storage system further includes means for subdividing one of the plurality of storage devices to form each of the at least two of the plurality of logical volumes, so that each of the at least two of the plurality of logical volumes is a hyper-volume, and wherein the controller combines the hyper-volumes into the virtual volume.

27. The storage system of claim 16, in combination with the processor to form the computer system, wherein the processor includes means for merging the plurality of presentations of the virtual volume received over the plurality of paths to form a single representation of the virtual volume in the processor.

28. The combination of claim 27, wherein the processor further includes means for deconstructing the single representation of the virtual volume into the at least two of the plurality of logical volumes.

29. The storage system of claim 15, wherein the at least one storage device is a disk drive.

30. A host computer for use in a computer system including a storage system coupled to the host computer, wherein the storage system includes at least one storage device to store a plurality of logical volumes, wherein the storage system combines at least two of the plurality of logical volumes into a virtual volume and presents the virtual volume to the processor as a single logical volume, the host computer comprising:

a processor; and means for deconstructing the virtual volume into the at least two of the plurality of logical volumes.

31. The host computer of claim 30, further including means for independently accessing the at least two of the plurality of logical volumes.

32. The host computer of claim 30, wherein the computer system is an open computer system.

33. The host computer of claim 30, wherein the computer system is a multi-path computer system including X paths coupling the host computer to the storage system, wherein the storage system combines Y of the plurality of logical volumes into the virtual volume, wherein the host computer is capable of accessing each of the Y logical volumes through each of the X paths, and wherein the host computer includes means for generating Z unique target address identifiers corresponding to the Y logical volumes, wherein Z is less than X times Y.

34. The host computer of claim 33, further including means for accessing each of the Y logical volumes through each of the X paths.

35. The host computer of claim 30, wherein the computer system is a multi-path computer system including a plurality of paths coupling the host computer to the storage system, wherein the host computer includes a plurality of ports for respectively coupling to the plurality of paths, and wherein the host computer receives a presentation of the virtual volume from the storage system over each of the plurality of ports.

36. The host computer of claim 35, further including means for merging the plurality of presentations of the virtual volume received over the plurality of ports to form a single representation of the virtual volume.

37. The host computer of claim 36, wherein the means for deconstructing the virtual volume operates upon the single representation of the virtual volume.

38. The host computer of claim 30, wherein the computer system is a multi-path computer system including at least three paths coupling the host computer to the storage system, wherein the host computer includes at least three ports for respectively coupling to the at least three paths, and wherein the host computer receives a presentation of the virtual volume from the storage system over each of the three ports.

39. The host computer of claim 30, wherein the storage system presents the host computer with information relating to a structure of the virtual volume, and wherein the means for deconstructing the virtual volume uses the information relating to the structure of the virtual volume to determine the manner in which the virtual volume is to be deconstructed.

40. A multi-path computer system comprising:

a processor;

a storage system including at least one storage device to store a plurality of logical volumes, the plurality of logical volumes including at least Y logical volumes; and a plurality of paths coupling the processor to the storage system, the plurality of paths including X paths coupling the processor to the storage system;

wherein the processor is capable of accessing each of the Y logical volumes through each of the X paths, and wherein the processor includes Z unique target address identifiers identifying the Y logical volumes, wherein Z is less than X times Y.

41. The multi-path computer system of claim 40, wherein the storage system includes a controller to combine at least two of the Y logical volumes into a virtual volume, to present the virtual volume to the processor as a single logical volume, and to further present the processor with information to enable the processor to deconstruct the virtual volume into the at least two of the plurality of logical volumes.

42. The multi-path computer system of claim 41, wherein the controller presents the virtual volume to the processor over each of the X paths.

43. The multi-path computer system of claim 42, wherein the processor includes means for merging the plurality of presentations of the virtual volume received over the X paths to form a single representation of the virtual volume in the processor.

44. The multi-path computer system of claim 41, wherein the processor includes means for independently accessing the at least two of the plurality of logical volumes.

45. The multi-path computer system of claim 40, wherein the computer system is an open computer system.

46. The multi-path computer system of claim 41, wherein the processor includes means for deconstructing the virtual volume into the at least two of the plurality of logical volumes.

47. The multi-path computer system of claim 40, wherein the at least one storage device is a disk drive.

48. A host computer for use in a multi-path computer system including a storage system having at least one storage device to store a plurality of logical volumes, the plurality of logical volumes including at least Y logical volumes, the multi-path computer system further including X paths coupling the host computer to the storage system, the host computer comprising:

a processor capable of accessing each of the Y logical volumes through each of the X paths, the processor including Z unique target address identifiers identifying the Y logical volumes, wherein Z is less than X times Y.

49. The host computer of claim 48, wherein the storage system includes a controller that combines at least two of the Y logical volumes into a virtual volume, presents the virtual volume to the processor as a single logical volume, and presents the processor with information relating to a structure of the single logical volume, and wherein the processor includes means for deconstructing the virtual volume into the at least two of the plurality of logical volumes.

50. The host computer of claim 49, wherein the controller presents the virtual volume to the processor over each of the X paths, and wherein the processor includes means for merging the plurality of presentations of the virtual volume received over the X paths to form a single representation of the virtual volume in the processor.

51. The host computer of claim 49, wherein the processor includes means for independently accessing the at least two of the plurality of logical volumes.

52. The computer system of claim 49, wherein the processor includes means for deconstructing the virtual volume into the at least two of the plurality of logical volumes.

53. The host computer of claim 48, wherein the host computer is an open computer system.

* * * * *